United States Patent
Cucknell et al.

(10) Patent No.: US 7,147,416 B2
(45) Date of Patent: Dec. 12, 2006

(54) CARGO RESTRAINT STRAPS FOR AUTOMOBILES

(75) Inventors: Alan Cucknell, Cambridge (GB); Iain Sabberton, Cambridge (GB); Peter Cauwood, Cambridge (GB); Julian Scarfe, Cambridge (GB); Jamie Norris, Hereford (GB); Neil Mason, Cambridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/069,139

(22) Filed: Mar. 1, 2005

(65) Prior Publication Data

US 2005/0249567 A1   Nov. 10, 2005

Related U.S. Application Data

(60) Provisional application No. 60/569,107, filed on May 7, 2004.

(51) Int. Cl.
*B61D 45/00* (2006.01)
(52) U.S. Cl. ...................................................... 410/97
(58) Field of Classification Search ............... 410/96, 410/97, 77, 117, 121; 296/37.1, 37.8, 37.13, 296/37.16
See application file for complete search history.

(56) References Cited

U.S. PATENT DOCUMENTS

| | | | |
|---|---|---|---|
| 3,438,673 A * | 4/1969 | Nelson ....................... 296/37.1 |
| 3,730,581 A | 5/1973 | Parkinson ..................... 296/37 |
| 4,484,701 A | 11/1984 | Frohm ......................... 224/273 |
| 4,964,771 A * | 10/1990 | Callihan ...................... 410/118 |
| 5,261,716 A | 11/1993 | Phelps ........................ 296/37.8 |
| 5,340,004 A * | 8/1994 | Moore ......................... 224/563 |
| 5,368,210 A * | 11/1994 | Wotring ...................... 224/404 |
| 5,601,198 A | 2/1997 | Reed ........................... 211/183 |
| 5,628,442 A * | 5/1997 | Wayne ......................... 224/543 |
| RE36,345 E * | 10/1999 | Moore ......................... 224/563 |
| 6,334,562 B1* | 1/2002 | Ament et al. ................ 224/563 |
| 6,471,276 B1* | 10/2002 | Brunsman et al. ........ 296/37.13 |
| 6,682,115 B1 | 1/2004 | Tiesler ....................... 296/37.1 |
| 2005/0236341 A1* | 10/2005 | Bao ........................... 211/13.1 |
| 2006/0022479 A1* | 2/2006 | Mulvihill et al. ........ 296/37.16 |

* cited by examiner

*Primary Examiner*—H Gutman
(74) *Attorney, Agent, or Firm*—Gigette M. Bejin; Miller Lawgroup, PLLC

(57) ABSTRACT

A flexible cargo restraining straps mounted on the sidewalls of the rear cargo area of an automotive vehicle to receive and restrain small cargo items from moving about the rear cargo area of the vehicle. The divider members are positionable along the longitudinal length of the restraining straps to permit the creation of a cargo receptacle that conforms to the size of the small cargo item being placed therein. Preferably, the divider members are slidable along slots formed in the sidewall of the rear cargo area and can be selectively locked into the desired position. Additional divider members can be added to the restraining straps as desired for creating cargo receptacles therein as needed. Alternatively, the cargo restraining straps can be mounted on the roof or on the interior of the door for the rear cargo area.

18 Claims, 4 Drawing Sheets

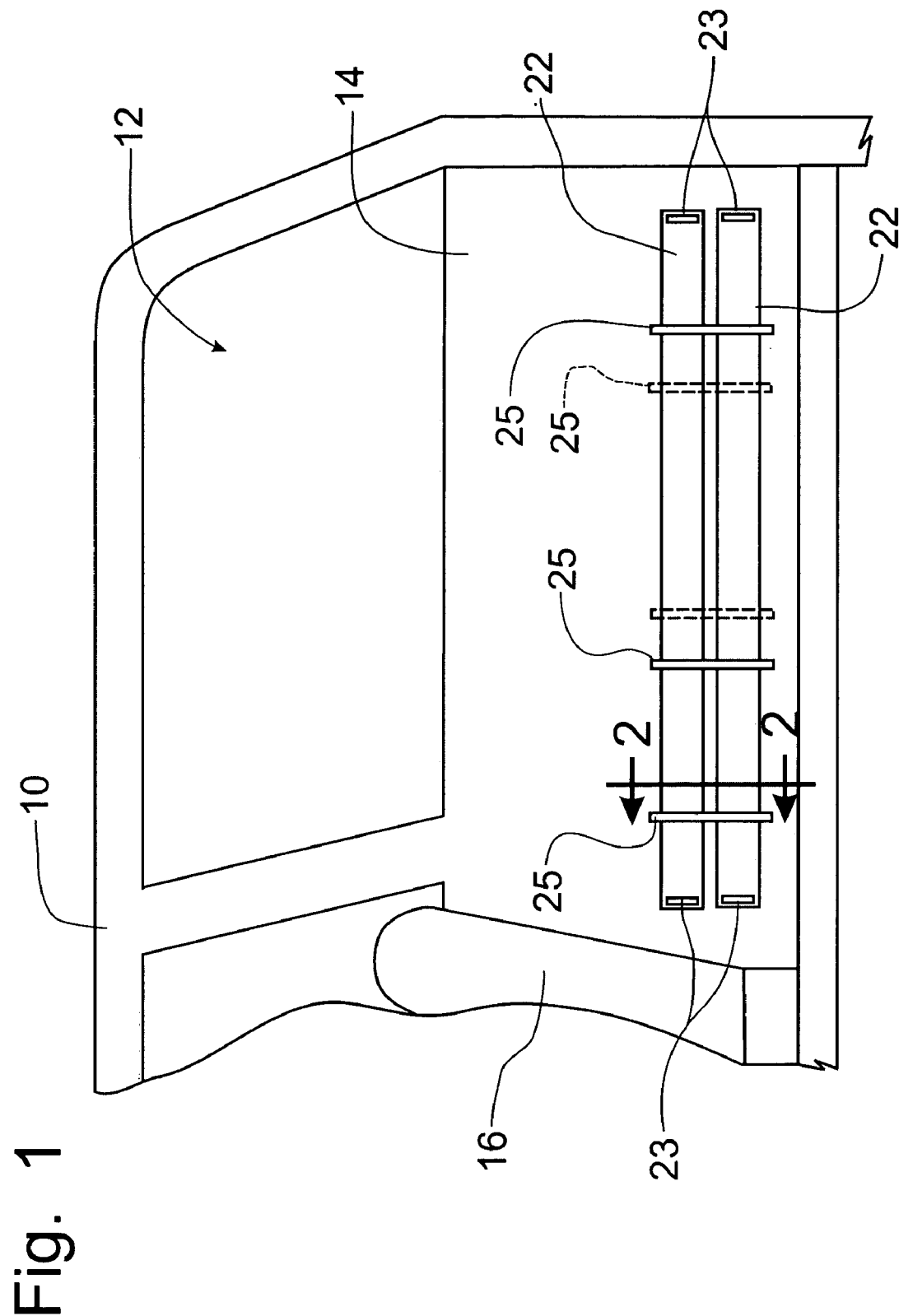

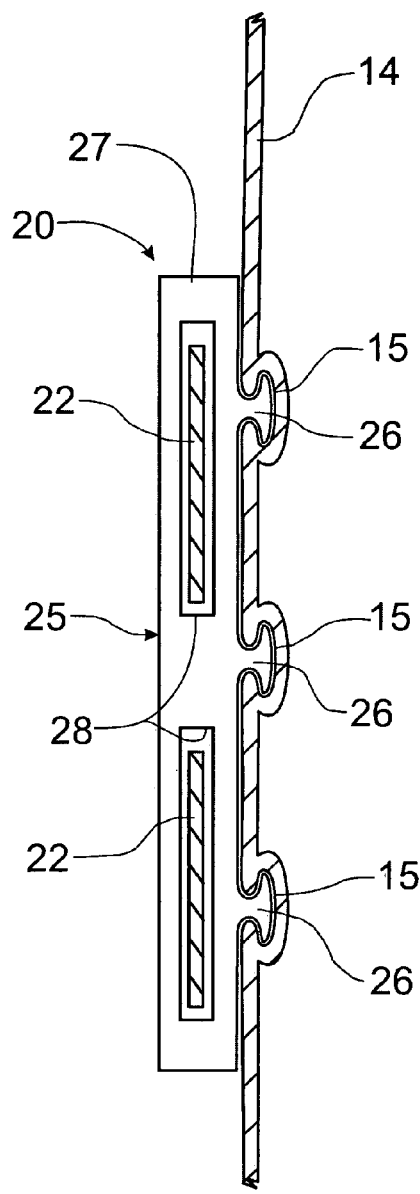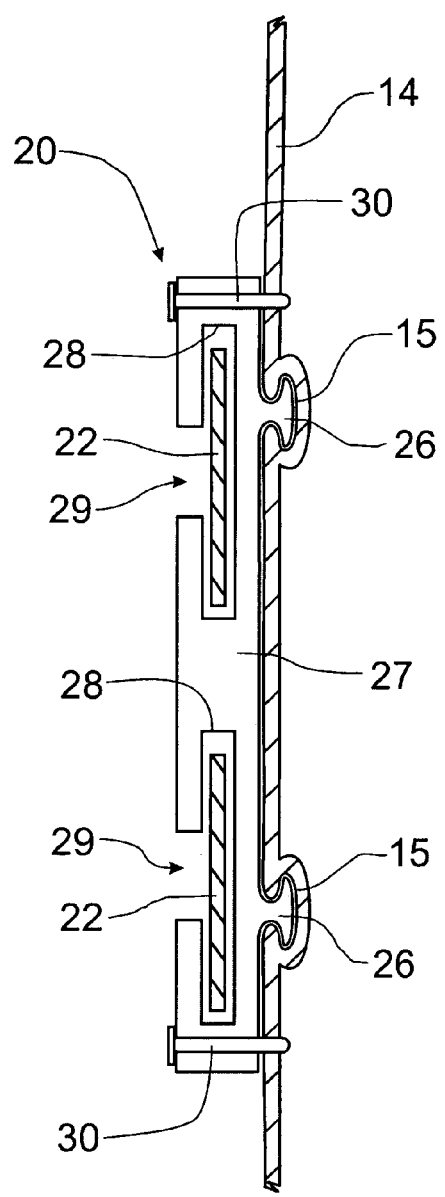

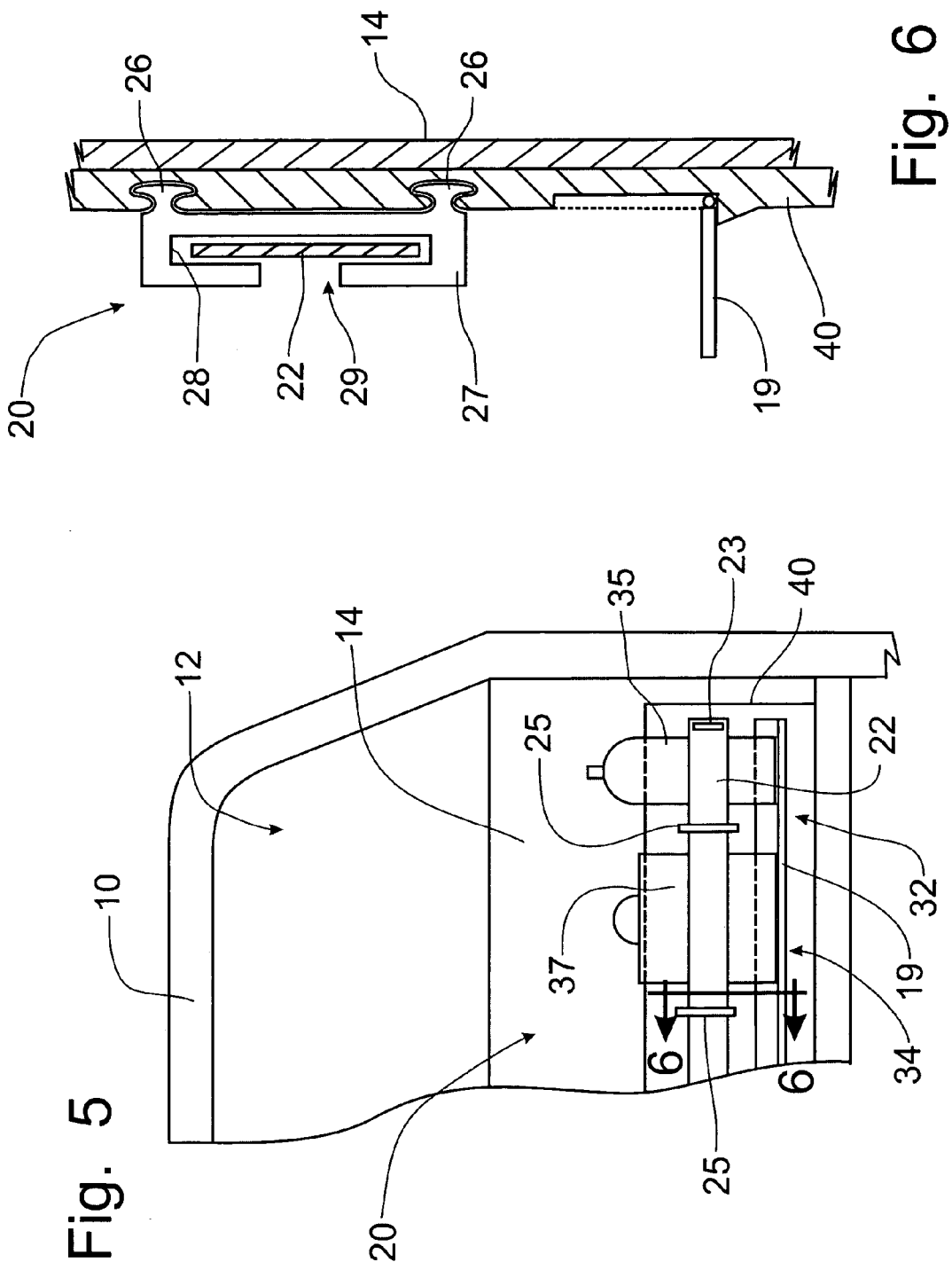

CARGO RESTRAINT STRAPS FOR AUTOMOBILES

CROSS-REFERENCE TO RELATED APPLICATIONS

This application claims domestic priority on U.S. Provisional Patent Application Ser. No. 60/569,107, filed May 7, 2004, the contents of which are incorporated herein by reference.

FIELD OF THE INVENTION

This invention relates to the restraint of cargo within the interior of automotive vehicles and, more particularly, to cargo restraint devices that are engagable with small cargo items to limit movement thereof within an automotive vehicle cargo area.

BACKGROUND OF THE INVENTION

The placement of cargo into the cargo area of an automotive vehicle, such as the rear cargo area of a van or sport utility vehicle, is typically placed loosely within the confines of the cargo area, allowing the cargo to shift from one position to another within the interior of the vehicle as the vehicle moves along the highway. A number of devices have been created to restrain the movement of such cargo, including netting and organizers.

A typical usage of the cargo area would be to store groceries that have been placed in bags at the grocery store to transport the groceries from the store to the place of residence. In some instances, the items are small and would normally roll around within the rear cargo area, possibly damaging the item.

In U.S. Pat. No. 3,730,581, issued to Charles Parkinson on May 1, 1973, and in U.S. Pat. No. 5,261,716, issued to Richard Phelps on Nov. 16, 1993, door packets are taught for holding small items, such as maps and the like. In these door pocket devices, the exterior covering is expandable, such as in the Parkinson patent where the exterior panel is elastic in nature. The flexible pocket concept is extended into the inside of the glove compartment door in an automobile, as is taught in U.S. Pat. No. 6,682,115, issued to John Tiesler on Jan. 27, 2004. As with the door pocket devices, the exterior panel of the packet device has some flexibility to permit the expansion of the pocket to fit small items therein.

Multiple door pockets forming receptacles for use in holding cassette tapes on the inside of the door for easy access by the operator of the vehicle are shown in U.S. Pat. No. 4,484,701, issued on Nov. 27, 1984 to Paul Frohn. The flexible barrier for restraining items on a shelf is taught in U.S. Pat. No. 5,601,198, issued to Doris Reed on Feb. 11, 1997. None of these prior art devices are operable to restrain the movement of small cargo items that are larger than the pocket on which the flexible panel is attached, and none have any flexibility with respect to the size of the restraining container for use with the small cargo items.

Accordingly, it would be desirable to provide a cargo restraining device for use in the rear cargo area of an automotive vehicle in which the restraining devices do not interfere with the loading of cargo into the rear cargo area when not in use, and which can be sized to better engage and restrain small cargo items into engagement with the restraining device.

SUMMARY OF THE INVENTION

It is an object of this invention to overcome the aforementioned disadvantages of the known prior art by providing flexible straps mounted to the sidewalls of the rear cargo area of an automobile to receive and restrain small cargo items placed into engagement therewith.

It is another object of this invention to provide a cargo restraining straps that are flexible to accommodate the shape of small cargo items.

It is still another object of this invention to provide a positionable divider operatively engaged with the cargo restraining straps to be movable to size a receptacle within the confines of the cargo restraining straps that would best engage a particular cargo item for restraint thereof.

It is a feature of this invention that the cargo restraining straps are flexible to permit expansion thereof into the interior of the rear cargo area of an automobile to fit around the shape of small cargo items for restraint thereof by the cargo straps.

It is another advantage of this invention that the cargo restraining straps prevent small cargo items, which would otherwise be rolling around within the rear cargo area, from moving about the rear cargo area of the automobile.

It is another feature of this invention that the cargo restrain straps are provided with divider members that are positionably adjustable along the longitudinal length of the straps to vary the size of the receptacle formed for holding small cargo items therewithin.

It is another advantage of this invention that the divider members can be positioned to tightly engage the small cargo item placed therein to prevent the small cargo item from becoming disengaged with the restraining straps.

It is still another feature of this invention that the divider members can be slidably engaged with the sidewall of the rear cargo area with slots formed therein to receive the divider members.

It is yet another feature of this invention that the number of divider members utilized on the cargo restraining straps can be varied by inserting or removing divider members in engagement with the restraining straps.

It is a further feature of this invention that the divider members can be selectively locked into the selected position for creating the desired size of receptacle for the small cargo item to be restrained by the cargo restraining straps.

It is yet another advantage of this invention that the cargo restraining straps can be utilized on the roof or on the interior of the cargo door, as well as on the interior sidewalls of the rear cargo area of the automobile.

It is a further advantage of this invention that the utilization of straps allows flexibility in the amount of force applied to the cargo being constrained, thereby permitting the system to be utilized for delicate items.

It is yet a further feature of this invention that the cargo restraining straps are positionable generally flush against the wall and, therefore, take up very little space within the vehicle cargo area when not in use.

It is yet a further advantage of this invention that the straps constrain cargo with a minimum of interior space being utilized, compared to fixed size boxes or compartments.

It is yet another object of this invention to provide cargo restraining straps with adjustably positionable divider members that can be utilized within the rear cargo area of a vehicle and which is durable in construction, inexpensive of manufacture, carefree of maintenance, facile in assemblage, and simple and effective in use.

These and other objects, features and advantages are accomplished according to the instant invention by providing a flexible cargo restraining straps mounted on the sidewalls of the rear cargo area of an automotive vehicle to receive and restrain small cargo items from moving about the rear cargo area of the vehicle. The divider members are positionable along the longitudinal length of the restraining straps to permit the creation of a cargo receptacle that conforms to the size of the small cargo item being placed therein. Preferably, the divider members are slidable along slots formed in the sidewall of the rear cargo area and can be selectively locked into the desired position. Additional divider members can be added to the restraining straps as desired for creating cargo receptacles therein as needed. Alternatively, the cargo restraining straps can be mounted on the roof or on the interior of the door for the rear cargo area.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is side elevational view of a representative rear cargo area of a vehicle having a cargo restraining straps incorporating the principles of the instant invention, representative movement of the divider members being shown in phantom;

FIG. 2 is cross-sectional view of the cargo restraining straps taken along lines 2—2 of FIG. 1 to depict a divider member mounted on the straps and engaged with a slotted configuration in the sidewall of the rear cargo area;

FIG. 3 is an alternative cross-sectional view of the cargo restraining straps similar to that of FIG. 2, but depicting a configuration for the divider member than can be removed from the restraining straps to permit the addition or subtraction of divider members for the restraining straps, an optional locking device being representatively depicted at the top of the divider member;

FIG. 5 is a side elevational view of the rear cargo area depicting an alternative embodiment of the cargo restraining straps including only a single strap and a support shelf for cooperating with the restraining strap to secure items against the sidewall of the vehicle, this embodiment further being formed as a self-contained system that can be detached from the vehicle sidewall; and FIG. 6 is an enlarged partial cross-sectional view of the embodiment depicted in FIG. 5 and corresponding to lines 6—6 of FIG. 5, the support shelf being depicted in the deployed position with the stowed position being shown in dotted lines.

DETAILED DESCRIPTION OF THE PREFERRED EMBODIMENT

Figure 4:
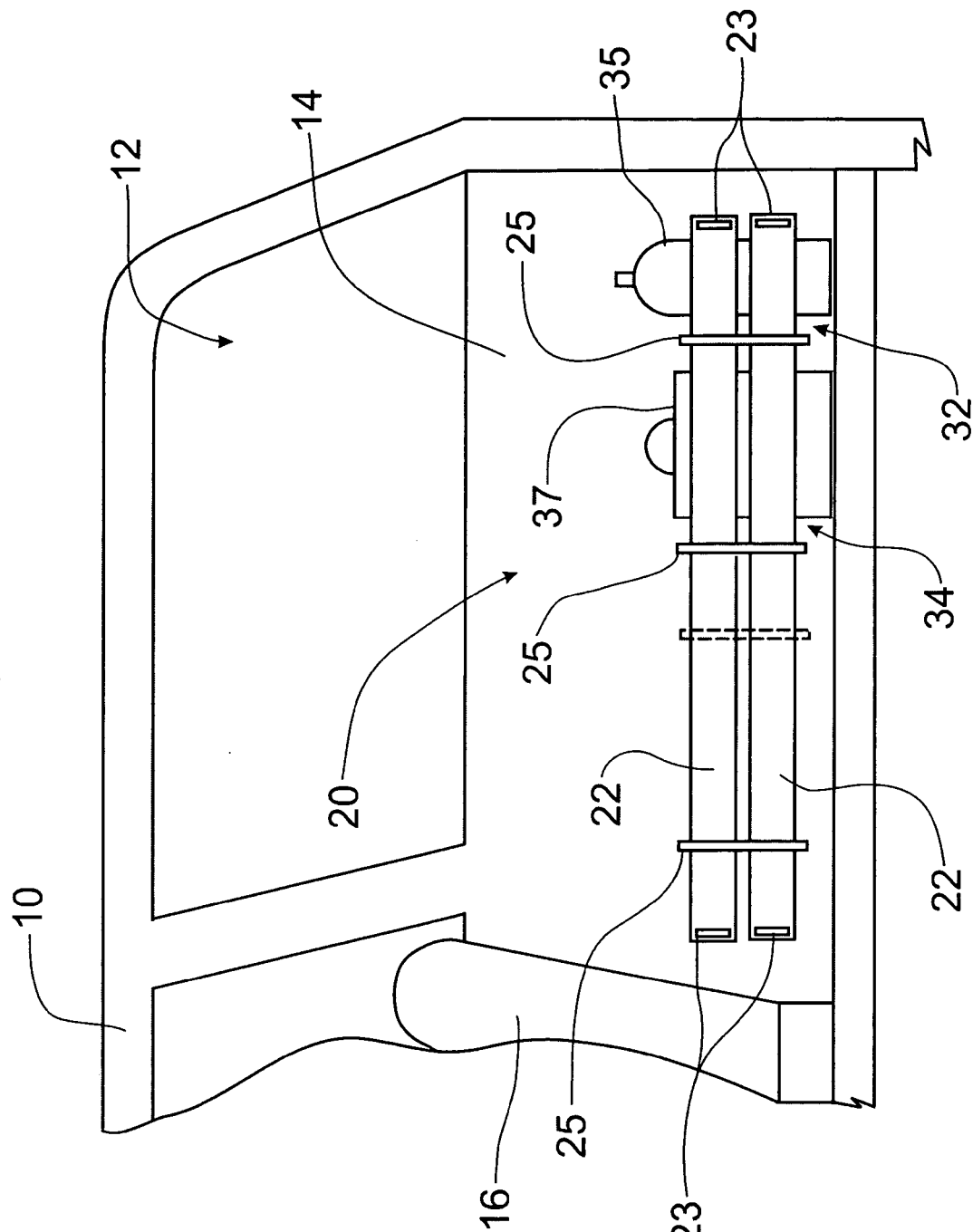
FIG. 4 is a side elevational view of the rear cargo area with the cargo restraining straps being utilized to restrain movement of a package and of a bottle with the size of the receptacles therefore being selectively created by the appropriate movement of the divider members on the restraining straps.

Referring to the drawings, the rear cargo area 12 of an automobile 10 having a cargo restraint apparatus 20 incorporating the principals of the instant invention can best be seen. While the cargo restraint apparatus 20 are depicted on the right sidewall 14 of the rear cargo area 12, one skilled in the art will recognize that the cargo restraint apparatus 20 will be located on the left sidewall (not shown) as a mirror image of cargo restraint strap apparatus 20 shown in FIGS. 1 and 4. Furthermore, one skilled in the art will realize that the cargo restraint apparatus 20 according to the principals of the instant invention can also be located on the roof, the back of the rear seat 16 and/or the rear door (not shown) defining the boundaries of the rear cargo area 12 of the automobile 10, or on substantially any generally flat surface of the automobile 10.

The cargo restraint apparatus 20 is formed of longitudinally-extending straps 22 which are securely attached at the ends 23 thereof to the supporting structure, which in the configuration shown in FIGS. 1 and 4, is the sidewall 14 of the rear cargo area 12 of the automobile 10. Preferably, two longitudinally extending straps 22 are provided to provide positional stability for the restrained cargo, although additional straps 22 can be provided as desired and the apparatus 20 can suitably operate with only one strap 22 as is depicted in FIGS. 5 and 6 and described in greater detail below. Furthermore, the straps 22 are depicted as covering substantially the entire longitudinal sidewall 14; however, the length of the straps 22 can be substantially less than that depicted in the drawings.

The straps 22 are preferably formed of elastic material so that the straps 22 can expand to accommodate the insertion of cargo items between the straps 22 and the supporting structure 14, as is depicted in FIG. 4, and have sufficient shape memory to urge the cargo against the supporting structure and return to a substantially flat orientation against the supporting structure 14 when not in use to restrain the movement of cargo engaged therewith. One skilled in the art will recognize that the straps could be formed of an inelastic material if a tensioning mechanism (not shown) were provided to maintain a positional force on items stowed within the straps 22. Accordingly, the straps 22 are attached to the supporting structure 14 only at the respective ends 23 thereof so that cargo may be inserted between the straps 22 and the supporting structure 14 along the entire length of the straps 22.

To vary the size of the receptacle to be formed to restrain cargo items between the straps 22 and the supporting structure 14, the cargo restraint apparatus 20 is provided with dividers 25, best seen in FIGS. 2 and 3. Preferably, the supporting structure 14 is formed with a plurality of grooves 15 to receive correspondingly shaped nodes 26 for sliding relationship therewith. The dividers 25 include a body portion 27 that have slots 28 formed therein for passage of the straps 22. The dividers 25 can either be mounted on the straps 22 permanently during the manufacturing process, as depicted in FIG. 2, or be capable of being mounted on the straps 22 as desired after manufacturing by permitting the straps 22 to be insertable through the openings 29 in the body portion 27 leading into the slots 28. Preferably, the supporting structure will have a formed vertical slot (not shown) that will accommodate removal of the nodes 26 from the grooves 15.

One skilled in the art will understand that the dividers 25 can be fixed to the support structure behind the straps 22 so that the dividers 25 are not movable along the longitudinal length of the straps 22, or in the alternative the straps could be selectively connectable to fixed attachment points on the sidewall. Furthermore, the dividers 25 could be flexible members, such as transverse straps, rather than rigid members as shown in the drawings. In fact, the straps 22 could be operable to restrain cargo stowed therein without the use of any dividers 25 whatsoever.

Preferably, the relationship between the nodes 26 and the grooves 15 is such that the nodes 26 are free to slide within the grooves 15 to move along the longitudinal length of the straps 22, but when tension is applied to the dividers 25, such as through the biasing forces exerted by the extended straps 22, the nodes 26 become frictionally engaged with the grooves 15 and sliding movement is restricted. Alternatively, the body portion 27 of the dividers 25 can be equipped with locking pins 30 that are preferably spring-loaded in an appropriate manner to engage a selected aperture in a row of apertures formed in the sidewall 14 above, and optionally below, the grooves 15 to provide a positive locking device to restrict sliding movement of the dividers 25 along the straps 22. As depicted in FIG. 3, the locking pins 30 can be provided at the top and at the bottom of the body portion 27 of the divider 25.

For positional stability, the sidewall 14 will be formed with at least two grooves 15 oriented parallel to the straps 22, as is depicted in FIG. 3. As seen in FIG. 2, a third groove 15 corresponding to the middle of the body portion 27 could be provided. This third groove 15 will provide additional frictional engagement with the nodes 26, and provide the ability to utilize smaller dividers 25 that would correspond only to a single strap 22, instead of both straps 22 as is depicted in FIG. 2. The dividers 25 can attach into longitudinal slots above the top of the upper strap 22 and below the bottom of the lower strap 22 to provide support for small items and can eliminate the need for nodes 26 in the dividers 25 and grooves 15 in the sidewall 14.

As is best seen in FIGS. 5 and 6, the cargo restraint apparatus 20 can be formed with a single strap 22 with optional dividers 25 cooperable therewith. A support shelf 19 can be positioned below the strap(s) 22 to support small items with the base thereof just below the level of the lower strap 22. The support shelf 19 can be a fixed member projecting outwardly from the sidewall 14 of the vehicle 10, or can be a pivotable, or slidable, member 19 that is movable between a deployed position, shown in solid lines in FIG. 6, and an inoperative position, shown in dotted lines in FIG. 6.

Furthermore, the entire apparatus 20 can be constructed as a detachable system formed on a support panel 40 that is detachably mounted on the sidewall 14 of the vehicle 10. With such a system, the cargo can be removed from the vehicle 10 as a bundle while still retained within the cargo restraint apparatus 20. Alternatively, the apparatus 20 could be mounted on a structure (not shown) that pulls out from the sidewall 14, or is hinged to the sidewall 14, for ease of insertion or removal of the cargo from the apparatus 20.

In operation, the configuration of the divider 25 depicted in FIG. 3 can be mounted on the straps 22 by fitting the individual straps 22 through the respective openings 29 in the body portion 27 to mount the divider on the straps 22. The nodes 26 are then inserted into the grooves 15 through a vertical slot (not shown) that permits the insertion of the divider 25 into a sliding engagement with the supporting structure, such as the sidewall 14 of the rear cargo area 16 of the automobile 10.

As depicted in FIG. 4, the dividers 25 are located along the straps 22 to form a receptacle between the straps 22 and the supporting structure 14 that is sized appropriately to receive the cargo to be selectively restrained thereby. For example, a bottle 35 will be placed in a receptacle 32 that is sized by the sliding of the divider 25 into the desired location, while a grocery bag 37 will require a larger receptacle 34 formed between two dividers 25. Clearly, the size of the receptacle can correspond to the specific cargo to be restrained by the apparatus 20 by appropriately moving the dividers 25 into the desired location. If frictional forces are not sufficient to maintain the divider 25 in the position selected, the locking pins 30 can be utilized to provide a positive engagement between the divider 25 and the supporting structure 14. If many small objects, such as tools, are to be restrained by the apparatus 20, a corresponding number of dividers 25 can be mounted on the straps 22.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

By way of example, the straps 22 could be formed of multiple layers, one on top of the other, with the layers attached to each other at longitudinally spaced places to provide a substitute for fixed dividers 25. The straps 22 could be formed with a textured surface or with corrugations to provide an enhanced grip on the cargo restrained therein. The dividers 25 could also be equipped with structure, such as hooks, suction cups or cup holders, to provide added functionality for the dividers 25. The straps 22 could be constructed with a lateral gradient of elasticity, for example, more elastic at the top of the strap 22 than at the bottom, which could facilitate the placement of cargo items within the straps 22 and to keep the cargo items restrained within the confines of the straps 22. As additional examples, the entire system 20 could be vertically mounted, as opposed to the horizontal orientation depicted in the drawings, so that gravity would assist in pulling on the restrained cargo items into the receptacle formed within the apparatus 20 above a divider 25. Furthermore, the multiple straps 22 do not have to be mounted in a parallel orientation as the straps could be angularly disposed to one another to provide a stable support for different sized objects.

Having thus described the invention, what is claimed is:

1. A cargo restraint apparatus for a rear cargo area of an automobile comprising:
   at least one elongated, longitudinally extending straps fixed at ends thereof to a supporting structure within said rear cargo area; and
   dividers slidably supported on said supporting structure and engaged with said at least one strap to be movable along said strap to form receptacles for receipt of cargo therein.

2. The cargo restraint apparatus of claim 1 wherein said strap is elastic and is extendible outwardly from said supporting structure to form said receptacles.

3. The cargo restrain apparatus of claim 2 further comprising at least two of said straps spaced vertically, said dividers being cooperable with at least one of said straps.

4. The cargo restraint apparatus of claim 3 wherein said dividers have nodes formed thereon to slidably engage grooves formed in said support structure.

5. The cargo restraint apparatus of claim 3 wherein said dividers have a body portion formed with a slot therein for passage of each respective strap.

6. The cargo restraint apparatus of claim 5 wherein said body portions are formed with openings into said slots for the passage of said straps into the corresponding slots.

7. In an automobile having a rear cargo area including a supporting structure therein, an improved cargo restraint apparatus comprising:
   at least two elongated, longitudinally extending elastic straps fixed at ends thereof to said supporting structure, said straps extending outwardly from said supporting structure to form variably sized receptacles for receipt of cargo therein; and
   dividers slidably supported on at least one of said straps to be movable along said at least one strap for selectively forming said variably sized receptacles.

8. The automobile of claim 7 wherein said dividers have nodes formed thereon to slidably engage grooves formed in said support structure.

9. The automobile of claim 7 wherein said dividers have a body portion formed with a slot therein for passage of each respective strap.

10. The automobile of claim 9 wherein said body portions are formed with openings into said slots for the passage of said straps into the corresponding slots.

11. The automobile of claim 9 wherein each said body portion includes at least one locking pin selectively engagable with said supporting structure to lock said divider into a desired location for forming said receptacles.

12. A method of restraining cargo within a rear cargo area of an automobile, said rear cargo area including supporting structure, comprising the steps of:
   providing a cargo restraint apparatus including a longitudinally extending strap fixed to said supporting structure and at least one divider slidably supported on said supporting structure and engaged with said strap to permit movement along said strap;
   sliding said at least one divider along said strap to form a receptacle for receipt of said cargo between said strap and said supporting structure; and
   positioning said cargo within said receptacle to be restrained from moving within said rear cargo area by said strap.

13. The method of claim 12 wherein said providing step provides a cargo restraint apparatus that includes at least two said straps spaced vertically with said dividers being cooperable with at least one of said straps, said straps being elastic and extending outwardly from said supporting structure during said positioning step to urge said cargo against said supporting structure.

14. The method of claim 13 wherein said extended straps place tension on said at least one divider to prevent sliding movement thereof along said straps.

15. The method of claim 13 wherein multiple dividers are slidably mounted on said supporting structure for movement along said straps, said sliding step causing a positioning of selected dividers to form a number of receptacles corresponding to the cargo to be restrained thereby.

16. The method of claim 13 wherein each said divider includes a locking pin engagable with said supporting structure to provide a positive positional lock for said at least one divider along said straps, said method further comprising the step of locking said divider against said supporting structure when said receptacle is formed.

17. The method of claim 13 wherein an additional divider can be added to said straps by the steps of:
   placing said straps into slots formed into a body portion of said additional divider; and
   slidably securing said additional divider on said supporting structure for movement thereof along said straps.

18. The method of claim 17 wherein said step of slidably securing said additional divider includes the step of positioning nodes formed on said body portion into grooves formed in said supporting structure for slidable engagement therebetween.

* * * * *